US010003607B1

(12) United States Patent
Kolman et al.

(10) Patent No.: US 10,003,607 B1
(45) Date of Patent: Jun. 19, 2018

(54) AUTOMATED DETECTION OF SESSION-BASED ACCESS ANOMALIES IN A COMPUTER NETWORK THROUGH PROCESSING OF SESSION DATA

(71) Applicant: EMC Corporation, Hopkinton, MA (US)

(72) Inventors: Eyal Kolman, Raanana (IL); Kineret Raviv, Herzeliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 239 days.

(21) Appl. No.: 15/079,219

(22) Filed: Mar. 24, 2016

(51) Int. Cl.
*H04L 29/06* (2006.01)

(52) U.S. Cl.
CPC ...... *H04L 63/1425* (2013.01); *H04L 63/0272* (2013.01); *H04L 63/1416* (2013.01)

(58) Field of Classification Search
CPC . G06F 21/50; H04L 63/1425; H04L 63/0272; H04L 63/1416
See application file for complete search history.

(56) References Cited

U.S. PATENT DOCUMENTS

| | | | |
|---|---|---|---|
| 6,505,039 B1 | 1/2003 | Boatwright | |
| 8,769,684 B2 * | 7/2014 | Stolfo | G06F 21/55 709/224 |
| 9,407,652 B1 * | 8/2016 | Kesin | G06N 7/005 |
| 9,516,053 B1 * | 12/2016 | Muddu | H04L 63/1425 |
| 2008/0162338 A1 | 7/2008 | Samuels et al. | |

(Continued)

FOREIGN PATENT DOCUMENTS

| | | |
|---|---|---|
| CN | 101349987 A | 1/2009 |
| JP | 2002297543 A | 10/2002 |

(Continued)

OTHER PUBLICATIONS

Dorothy E. Denning, "An Intrusion-Detection Model," IEEE Transactions on Software Engineering, Feb. 1987, pp. 222-232, vol. SE-13, No. 2.

(Continued)

*Primary Examiner* — Eleni A Shiferaw
*Assistant Examiner* — Hee K Song
(74) *Attorney, Agent, or Firm* — Ryan, Mason & Lewis, LLP (57) ABSTRACT

A processing device in one embodiment comprises a processor coupled to a memory and is configured to obtain data characterizing a plurality of network sessions for each of a plurality of user identifiers. The network sessions are initiated from a plurality of user devices over at least one network and may comprise respective virtual private network (VPN) sessions. The processing device is further configured to process the data characterizing the network sessions for a given one of the plurality of user identifiers to generate a network session profile for the given user identifier, the network session profile comprising a plurality of histograms for respective ones of a plurality of features extracted from the data characterizing the plurality of network sessions for the given user identifier. A risk score is generated for a current network session utilizing features extracted from the data characterizing that session and the network session profile.

21 Claims, 2 Drawing Sheets

(56) References Cited

U.S. PATENT DOCUMENTS

| | | | |
|---|---|---|---|
| 2013/0091539 A1* | 4/2013 | Khurana | G06F 21/552 726/1 |
| 2013/0097709 A1* | 4/2013 | Basavapatna | G06F 21/552 726/25 |
| 2014/0230051 A1 | 8/2014 | Vallinayagam et al. | |
| 2014/0237545 A1* | 8/2014 | Mylavarapu | H04L 63/1433 726/3 |
| 2015/0161394 A1 | 6/2015 | Ferragut et al. | |
| 2015/0319185 A1* | 11/2015 | Kirti | H04L 67/306 726/23 |
| 2015/0355957 A1* | 12/2015 | Steiner | G06F 11/0772 714/37 |
| 2016/0226905 A1* | 8/2016 | Baikalov | H04L 63/1433 |

FOREIGN PATENT DOCUMENTS

| | | |
|---|---|---|
| JP | 2005301928 A | 10/2005 |
| WO | 2015043491 A1 | 4/2015 |

OTHER PUBLICATIONS

C. Xiao et al., "Mobile Speed Estimation for TDMA-Based Hierarchical Cellular Systems," IEEE Transactions on Vehicular Technology, Jul. 2001, pp. 981-991, vol. 50, No. 4.

RSA Security Analytics, "Detect & Investigate Threats." Data Sheet, Oct. 2013, 6 pages.

Y. Wang, "A Multinomial Logistic Regression Modeling Approach for Anomaly Intrusion Detection," Computers and Security, Nov. 2005, pp. 662-674, vol. 24, No. 8.

D. Canali et al., "On the Effectiveness of Risk Prediction Based on Users Browsing Behavior," Proceedings of the 9th ACM Symposium on Information, Computer and Communications Security, Jun. 2014, pp. 171-182.

Y. Carlinet et al., "Analysis of Computer Infection Risk Factors Based on Customer Network Usage," Proceedings of the Second International Conference on Emerging Security Information, Systems and Technologies (SECURWARE), Aug. 2008, pp. 317-325, Cap Esterel, France.

U.S. Appl. No. 14/869,354, filed in the name of Richard Chiles on Sep. 29, 2015 and entitled "Automated Detection of Time-Based Access Anomalies in a Computer Network Through Processing of Login Data."

Arvind Thiagarajan, "Probabilistic Models for Mobile Phone Trajectory Estimation," Doctoral Dissertation, Massachusetts Institute of Technology (MIT), Sep. 2011, 161 pages.

G. Chandrasekaran et al., "Vehicular Speed Estimation Using Received Signal Strength from Mobile Phones," 12th ACM International Conference on Ubiquitous Computing (UbiComp), Sep. 26-29, 2010, pp. 237-240, Copenhagen, Denmark.

\* cited by examiner

FIG. 1

AUTOMATED DETECTION OF SESSION-BASED ACCESS ANOMALIES IN A COMPUTER NETWORK THROUGH PROCESSING OF SESSION DATA

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, fraudulent access attempts made by human users or possibly by networks of compromised computers or "botnets."

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, conventional credential-based authentication techniques and other traditional defenses typically deployed by enterprise network security systems today often fail at detecting and remediating access anomalies at a sufficiently early stage.

SUMMARY

Illustrative embodiments of the invention provide techniques for automated detection of session-based access anomalies in a computer network. For example, some embodiments process data characterizing virtual private network (VPN) sessions in order to generate network session profiles for respective users, and utilize the network session profiles in conjunction with features extracted from current sessions in order to detect access anomalies in the current sessions. Such arrangements supplement conventional credential-based authentication techniques and advantageously provide enhanced security against APTs and other types of attacks in enterprise computer networks.

In one embodiment, a processing device comprises a processor coupled to a memory and is configured to obtain data characterizing a plurality of network sessions for each of a plurality of user identifiers. The network sessions are initiated from a plurality of user devices over at least one network and may comprise respective VPN sessions or other types of network sessions. The processing device is further configured to process the data characterizing the network sessions for a given one of the plurality of user identifiers to generate a network session profile for the given user identifier, the network session profile comprising a plurality of histograms for respective ones of a plurality of features extracted from the data characterizing the plurality of network sessions for the given user identifier, to obtain data characterizing a current network session for the given user identifier, and to generate a risk score for the current network session based on one or more features extracted from the data characterizing the current network session for the given user identifier and the network session profile for the given user identifier. The risk score is compared to a threshold and an alert relating to the current session is generated based on a result of comparing the risk score to the threshold. The alert is transmitted to a security agent.

A given processing device configured with functionality for automated detection of session-based access anomalies may be implemented, for example, in one or more network devices of a computer network, or in a security analytics system or other type of network security system associated with the computer network.

These and other illustrative embodiments include, without limitation, methods, apparatus, networks, systems and processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
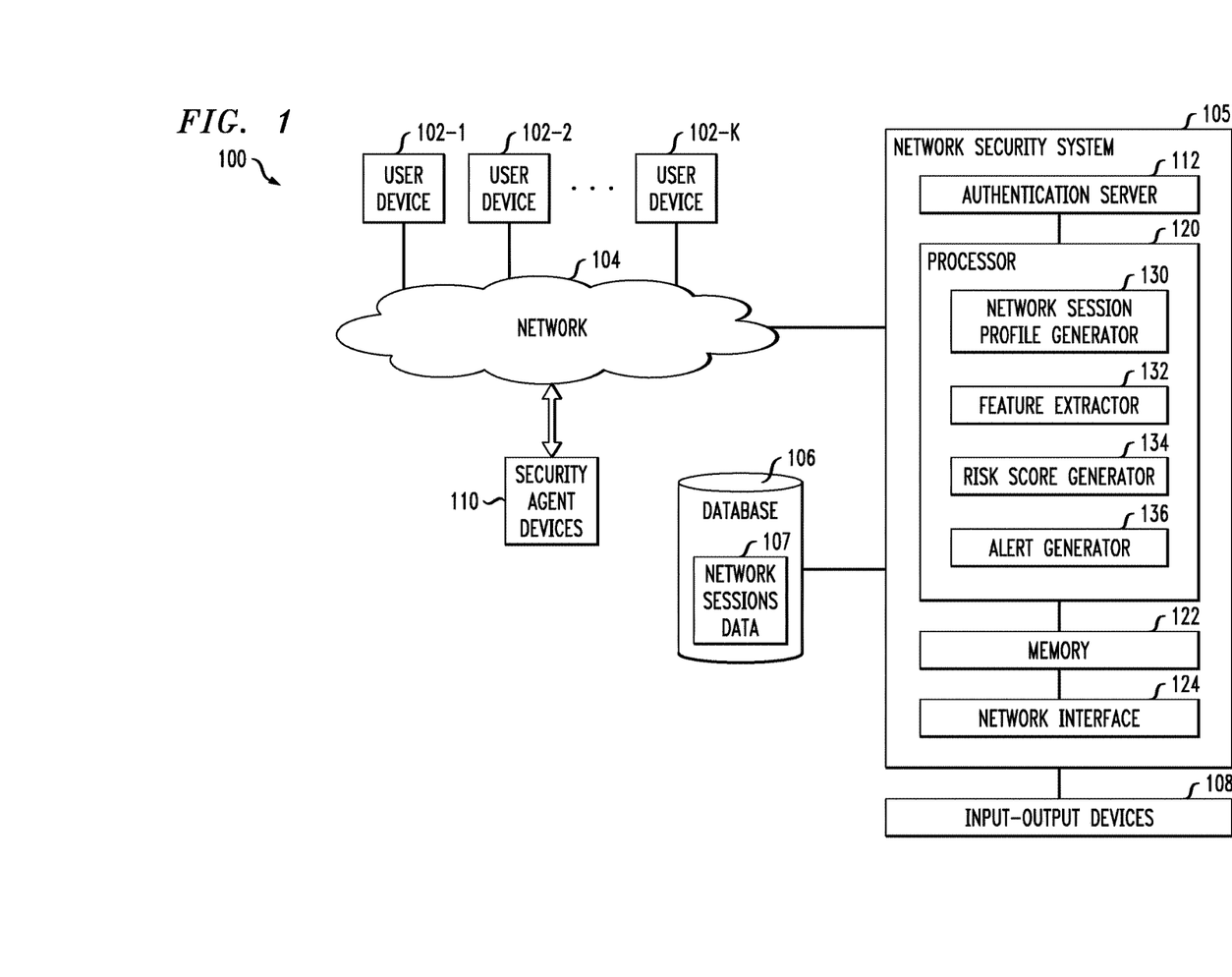
FIG. 1 is a block diagram of a computer network configured for automated detection of session-based access anomalies through processing of data characterizing network sessions in an illustrative embodiment of the invention.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The network security system 105 has an associated database 106 configured to store data characterizing multiple network sessions for each of a plurality of distinct user identifiers. The database 106 more particularly stores network sessions data 107 illustratively comprising VPN session data for VPN connections initiated within the computer network 100. It should be noted that the term "network sessions data" as used herein is intended to be broadly construed, and may comprise, for example, authentication data or other types of login data including timestamps and other information associated with login events.

The database 106 in the present embodiment is implemented using one or more storage systems associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment.

The network sessions data 107 illustratively comprises respective timestamps and other information characterizing successful logins processed in conjunction with users attempting to access protected resources of the computer network 100 via the user devices 102. Other types of login events or more generally network session events may be used in other embodiments. As noted above, such network sessions illustratively comprise VPN sessions initiated within the computer network 100.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

In the present embodiment, alerts generated by the network security system 105 are provided over the network 104 to one or more security agent devices 110. Such devices, like the user devices 102, can illustratively comprise mobile telephones, laptop computers, tablet computers, desktop computers, or other types of computers or processing devices configured for communication over network 104 with the network security system 105. For example, a given security agent device can comprise a mobile telephone equipped with a mobile application configured to receive alerts from the network security system 105 and to provide an interface for a security agent to select particular remedial measures for responding to the alert. Examples of such remedial measures may include logging off the user device in question, or requiring various additional authentication factors for subsequent access attempts made from the user device in question.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

The network security system 105 comprises an authentication server 112. Login events initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors. Upon verification of the presented authentication factors, the authentication server 112 grants the requesting user device 102 access to one or more protected resources of the computer network 100. Although shown as an element of the network security system 105 in this embodiment, the authentication server 112 in other embodiments can be implemented at least in part externally to the network security system 105, for example, as a stand-alone server, set of servers or other type of authentication system coupled to the network 104.

In the FIG. 1 embodiment, a successful access attempt is assumed to represent a login event for the corresponding user identifier and is logged in the database 106 as part of the network sessions data 107. Other types of authentication mechanisms and associated login events or other network sessions data can be used in other embodiments. For example, network sessions data in some embodiments can illustratively include additional data characterizing one or more other aspects of a given network session, such as ground speed of a mobile device during the given network session. Numerous techniques for estimating ground speed of a mobile device are known in the art and can be applied in embodiments of the present invention. Some embodiments utilize a ground speed model based on a given such estimation technique in order to generate a ground speed score for each of a plurality of user devices.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102 and the security agent devices 110, and illustratively comprises one or more conventional transceivers.

The processor 120 further comprises a network session profile generator 130, a feature extractor 132, a risk score generator 134 and an alert generator 136.

The network session profile generator 130 is configured to obtain data characterizing multiple network sessions for each of a plurality of user identifiers and to process the data associated with the user identifiers to generate respective network session profiles for those user identifiers. Each of the user identifiers illustratively identifies a particular user associated with at least a corresponding one of the user devices 102. In addition, at least a subset of the network sessions are illustratively initiated from the user devices 102 over the network 104. As noted above, the network sessions data 107 illustratively includes information relating to login events associated with respective logins initiated from user devices 102 over the network 104, although additional or alternative types of network sessions data could be processed in other embodiments. The processed network sessions data illustratively comprises at least portions of the network sessions data 107 stored in the database 106, although network sessions data can be captured and stored for subsequent processing in the network security system 105 of the computer network 100 in other ways.

The network session profile generated for a given one of the user identifiers illustratively comprises a plurality of histograms for respective ones of a plurality of features extracted at least in part from the data characterizing the network sessions for the given user identifier. Such feature extraction is assumed to be performed by the feature extractor 132 operating in conjunction with the network session profile generator 130.

The feature extractor 132 is further configured to obtain data characterizing a current network session for the given user identifier and to extract features from the data characterizing the current network session for the given user identifier.

The risk score generator 134 generates a risk score for the current network session based on one or more features extracted from the data characterizing the current network session for the given user identifier and the network session profile for the given user identifier.

The alert generator 136 is configured to compare the risk score to a threshold, and to generate an alert relating to the current session event based on a result of the comparison. The alert in the present embodiment is assumed to be transmitted via the network interface 124 over the network 104 to a security agent associated with one of the security agent devices 110. In other embodiments, multiple alerts of different types can be generated relating to the current session.

Additional description regarding more detailed examples of network session profiles, extracted features, risk scores and comparison thresholds that are used in illustrative embodiments will be provided below.

The arrangement described above advantageously permits the network security system 105 to focus its efforts on the particular ones of the user devices 102 that are most likely subject to attacks. Accordingly, the limited resources of the network security system 105 available for attack detection and remediation can be more intelligently and effectively deployed in the computer network 100, resulting in improved performance as well as enhanced security against APTs and other types of attacks.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the network session profile generator 130, feature extractor 132, risk score generator 134 and alert generator 136 may be implemented at least in part in the form of software that is stored in memory 122 and executed by processor 120. Similarly, at least portions of the authentication server 112 of the network security system 105 can be implemented at least in part in the form of software that is stored in memory 122 and executed by processor 120.

It is to be understood that the particular set of elements shown in FIG. 1 for automatically detecting session-based access anomalies involving user devices 102 of computer network 100 and for automatically implementing remedial measures based on the detected session-based access anomalies is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and associated elements such as authentication server 112, network session profile generator 130, feature extractor 132, risk score generator 134 and alert generator 136 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated authentication server 112 as part of or in conjunction with a security information and event management (SIEM) system, such as the enVision® platform, also commercially available from RSA. Such an SIEM system is also considered another possible example of a "network security system" as that term is broadly used herein. In an embodiment of this type, at least portions of the network sessions data 107 stored in the database 106 illustratively comprise security logs collected by the STEM system.

An exemplary process utilizing network session profile generator 130, feature extractor 132, risk score generator 134 and alert generator 136 of the network security system 105 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 210. These steps are assumed to be performed by the processor 120 utilizing its modules 130, 132, 134 and 136.

In step 200, data characterizing multiple network sessions for each of a plurality of user identifiers is obtained. At least a portion of the network sessions are assumed to be comprise VPN sessions initiated from user devices 102 over the network 104, although other types of network sessions can be processed in other embodiments. The data processed in step 200 may include, for example, network sessions data 107 obtained by the network security system 105 from the database 106. As mentioned previously, such data can include, for example, information characterizing login events associated with respective logins initiated from user devices 102 over the network 104, as well as additional or alternative network sessions data illustratively relating to VPN sessions in computer network 100.

The user identifier may comprise a username or other type of user identifying information as well as combinations of multiple instances of such information of different types. The term "user identifier" is therefore intended to be broadly construed.

In step 202, the data characterizing the network sessions for a given one of the plurality of user identifiers is processed to generate a network session profile for the given user identifier. The network session profile illustratively comprises a plurality of histograms for respective ones of a plurality of features extracted at least in part from the data characterizing the plurality of network sessions for the given user identifier.

By way of example, the extracted features in some embodiments comprise one or more extracted features for each of device hostname, device location, session behavior and number of failed sessions, although subsets of these extracted features as well as additional or alternative sets of extracted features can be used in other embodiments.

The device hostname and device location illustratively comprise respective hostname and location of a given one of the user devices 102 at session initiation. In the case of the device hostname, such a hostname may comprise a normalized device hostname obtained by applying one or more normalization operations to the device hostname. For the device location, the extracted features can include, for example, a country, an autonomous system (AS) identifier and a ground speed score. The AS identifier illustratively identifies the AS of the VPN of the corresponding network session. Other examples of device location information include city and service provider.

The one or more extracted features for session behavior comprise a session start time, a session duration, a session day type indicating if the session day is a weekday or a weekend, a number of bytes sent during the session and a number of bytes received during the session. The number of bytes sent can in some embodiments be normalized by session duration or number of bytes during the session. Again, other types of features indicative of session behavior can be extracted in a given embodiment, such as internal, external or VPN server IP addresses, or session state information such as session opened, session closed and session failed.

The one or more extracted features for number of failed sessions illustratively comprises a number of failed sessions determined as a function of number of failed sessions for the given user identifier over a prior time period of predetermined length and number of failed sessions for the given user identifier since a last successful session for the given user identifier. As a more particular example, in an embodiment in which X1 denotes the number of failed sessions for the user identifier over the previous 24 hours measured from the current session start time, and X2 denotes the number of failed sessions for the given user identifier since the last successful session measured from the current session start time, the number of failed sessions is illustratively given by min (X1, X2).

The above-noted histogram for a given one of the extracted features illustratively comprises a plurality of bins where i is a bin index. A given one of the bins denoted bin i has a bin width given by $w[i]$, and a bin probability given by $Prob[i]=n[i]/N$ where $n[i]$ denotes the number of network sessions having values for the given extracted feature that fall into bin i and N denotes the total number of network sessions in the plurality of network sessions for the given user identifier. Bin i also has a bin probability density function given by $Pdf[i]=Prob[i]/w[i]$, although other types of histograms may comprise additional or alternative bin arrangements and associated statistics in other embodiments.

In some embodiments, there are multiple histograms associated with each of one or more of the extracted features. For example, a given one of the extracted features may have at least first and second histograms associated therewith, with the first histogram comprising a user histogram for the corresponding extracted feature and the second histogram comprising a group histogram for that extracted feature. The user histogram is illustratively generated from data characterizing the plurality of network sessions for the given user identifier and the group histogram is illustratively generated from data characterizing a plurality of network sessions for the given user identifier and data characterizing a plurality of network sessions for each of multiple other user identifiers.

Thus, in some embodiments, certain extracted features, or possibly all extracted features, each have a user histogram as well as a group histogram. Users can be separated into groups in a variety of different ways. For example, there may be only a single group, such that all of the users are part of the single group. Other types and arrangements include, for example, different groups for different business groups within a given enterprise, or other groupings based on known similar characteristics shared by certain users.

In step 204, a risk score is generated for a current network session for the given user identifier based on one or more features extracted from data characterizing the current network session for the given user identifier and the network session profile for the given user identifier. The features extracted from the current network session in this embodiment illustratively include the same set of features that were extracted from other network sessions for the given user identifier in generating the corresponding network session profile.

In some embodiments, the risk score is determined as a combination of feature risk scores computed for respective ones of the extracted features. A feature risk score for a given extracted feature can be computed, for example, by obtaining a value of the feature for the current session, identifying the particular one of the histogram bins into which the feature value falls, computing the bin probability density function for that particular bin, computing significance of the bin probability density function, and outputting the significance of the bin probability density function as the feature risk score.

In these and other arrangements involving computation of individual feature risk scores, a composite risk score may be generated for the current network session based on the network session profile for the given user identifier by generating feature risk scores for respective ones of the extracted features, applying weights to the feature risk scores, and combining the weighted feature risk scores into the composite risk score.

The combining of the weighted feature risk scores into a composite risk score illustratively comprises computing the composite risk score in accordance with the following equation:

$$\text{Score[session]} = 1 - \frac{1}{\sum C_i}(C_1 \cdot S[f_1] + C_2 \cdot S[f_2] + \ldots + C_M \cdot [f_M]),$$

where M is the number of extracted features, $S[f_i]$ denotes a feature risk score and $C_i$ denotes an applied weight.

This computation illustratively excludes any features that do not have feature scores. It is assumed that if a specific feature has a null value, it has no feature score. Accordingly, the above computation includes only those features that have feature scores, such that the summation is over non-null features. Also, the composite risk score for the current session may only be computed if the session has at least a specified minimum number of feature scores. In this example composite risk score formulation, the most risky composite risk score is a value of 1 and the least risky composite risk score is a value of 0.

In embodiments that utilize both user risk scores and group risk scores, feature risk scores of the type described above are illustratively computed separately for both a given user identifier and a group that includes that user. The feature risk score computed for the user identifier is also referred to as a user risk score and is based on the user histogram for the corresponding one of the extracted features. The feature risk score computed for the group that includes the given user identifier is also referred to as a group risk score and is based on the group histogram for the corresponding one of the extracted features. The user and group feature risk scores are combined to generate a single feature risk score for the corresponding feature. Such an arrangement allows the composite risk score to be normalized based on session behavior and other characteristics of the group to which the user belongs, thereby advantageously reducing the likelihood of false alarms in the session-based anomaly detection.

A given feature risk score based on both user and group risk scores is illustratively generated by generating a user risk score for a given one of the extracted features utilizing the corresponding user histogram, generating a group risk score for the given one of the extracted features utilizing the corresponding group histogram, and combining the user risk score and the group risk score to generate a feature risk score for the given extracted feature. This is repeated for each of at least a subset of the extracted features. It should be noted in this regard that in a given embodiment combinations of user and group risk scores can be used to compute feature risk scores for some extracted features, while for other extracted features only user risk scores are utilized as the corresponding feature risk scores.

Combining the user risk score and the group risk score to generate a feature risk score for a given extracted feature illustratively involves computing the feature risk score in accordance with the following equation:

$$S[f] = (1 - \alpha_G) \cdot S_U[f] + \alpha_G \cdot S_G[f],$$

where $S[f]$ is the feature risk score, $S_U[f]$ is the user risk score, $S_G[f]$ is the group risk score, $\alpha_G$ is a group weighting function given by $\alpha_G = e^{-\beta N}(1 - \alpha_0) + \alpha_0$, $\alpha_0$ is an initial group weight parameter and N denotes the total number of network sessions in the plurality of network sessions for the given user identifier, and where $\alpha_G = 1$ for $N=0$, $\alpha_G = \alpha_0$ for $N \to \infty$ and $\alpha_G(N)$ is a monotonically decreasing function with respect to N. A value of $\beta = 0.09$ can be used in some embodiments although other values are possible. The initial group weight parameter $\alpha_0$ and the $\beta$ value are illustratively predetermined but can be adjusted over time based on machine learning or other similar functionality.

Accordingly, in this embodiment, the feature risk score for a given extracted feature is computed as a weighted combination of the user risk score and the group risk score. The function $\alpha_G(N)$ is configured such that when the user histograms for the given user identifier are based on only a few network sessions, the group risk score is weighted more heavily in the corresponding feature risk score, but as the user histograms for the given user identifier are based on increasingly larger numbers of network sessions, the group risk score is weighted less heavily in the feature risk score.

The multiple feature risk scores generated for respective extracted features using these or other techniques can then be combined using a weighting approach of the type previously described.

In step 206, the risk score is compared to a threshold and an alert is generated for the current network session based on a result of comparing the risk score to the threshold. For example, the alert may be generated if the risk score exceeds the threshold. The risk score referred to in this step is illustratively a composite risk score generated by weighted combination of the risk scores computed for respective ones of the extracted features.

It is assumed in the present embodiment that the current network session is processed in real time by the network security system 105, responsive to initiation of the current network session within the computer network 100. In other embodiments, the current network session can be processed as part of a batch of additional network sessions retrieved from the database 106 at one of a plurality of periodic processing intervals. The network security system 105 can therefore be configured to support a real-time processing mode of operation, a batch processing mode of operation, or combinations of real-time processing, batch processing or other types of processing modes.

In some embodiments, generating an alert relating to the current session based on a result of comparing the risk score to the threshold comprises generating an alert of a first type based on a result of comparing a network session risk score to a first threshold, and generating an alert of a second type different than the first type based on a result of comparing a ground speed score to a second threshold. Accordingly, multiple alerts can be generated relative to respective different thresholds in some embodiments.

As a more particular example, the first alert can be a composite risk score alert based on comparison of the composite risk score to a risk threshold, and the second alert can be a ground speed alert generated by comparing a ground speed feature score to a ground speed score threshold, possibly subject to one or more additional conditions relating to hostname. Such additional conditions can be an indication that a hostname score is less than or equal to a hostname score threshold and the hostname is not a null value.

In step 208, the alert is provided to a security agent and one or more automated remedial actions are taken in the network security system 105. For example, the alert may be transmitted over the network 104 to one of the security agent devices 110. The automated remedial actions can illustratively include, for example, requiring submission of one or more additional authentication factors from a given one of the user devices 102 that is determined to be associated with an anomalous network session. Such remedial actions can include terminating the current network sessions or suspending the current network session until the one or more additional authentication factors are obtained and verified.

In step 210, one or more network session profiles for respective ones of the user identifiers are updated. For example, the profiles can be continuously or periodically tuned based on additional network sessions that occur for a particular user identifier within the computer network 100.

Additional instances of steps 200 through 210 can be performed responsive to occurrence of additional network sessions for respective user identifiers or may otherwise be repeated periodically in order to ensure that session-based anomalies are accurately and efficiently detected within the computer network 100.

Numerous other techniques can be used in association with detection of session-based access anomalies through processing of data characterizing multiple network sessions for each of a plurality of user identifiers. For example, alternative processes can include other types and arrangements of automated remedial actions in response to a detected session-based access anomaly.

Figure 2:
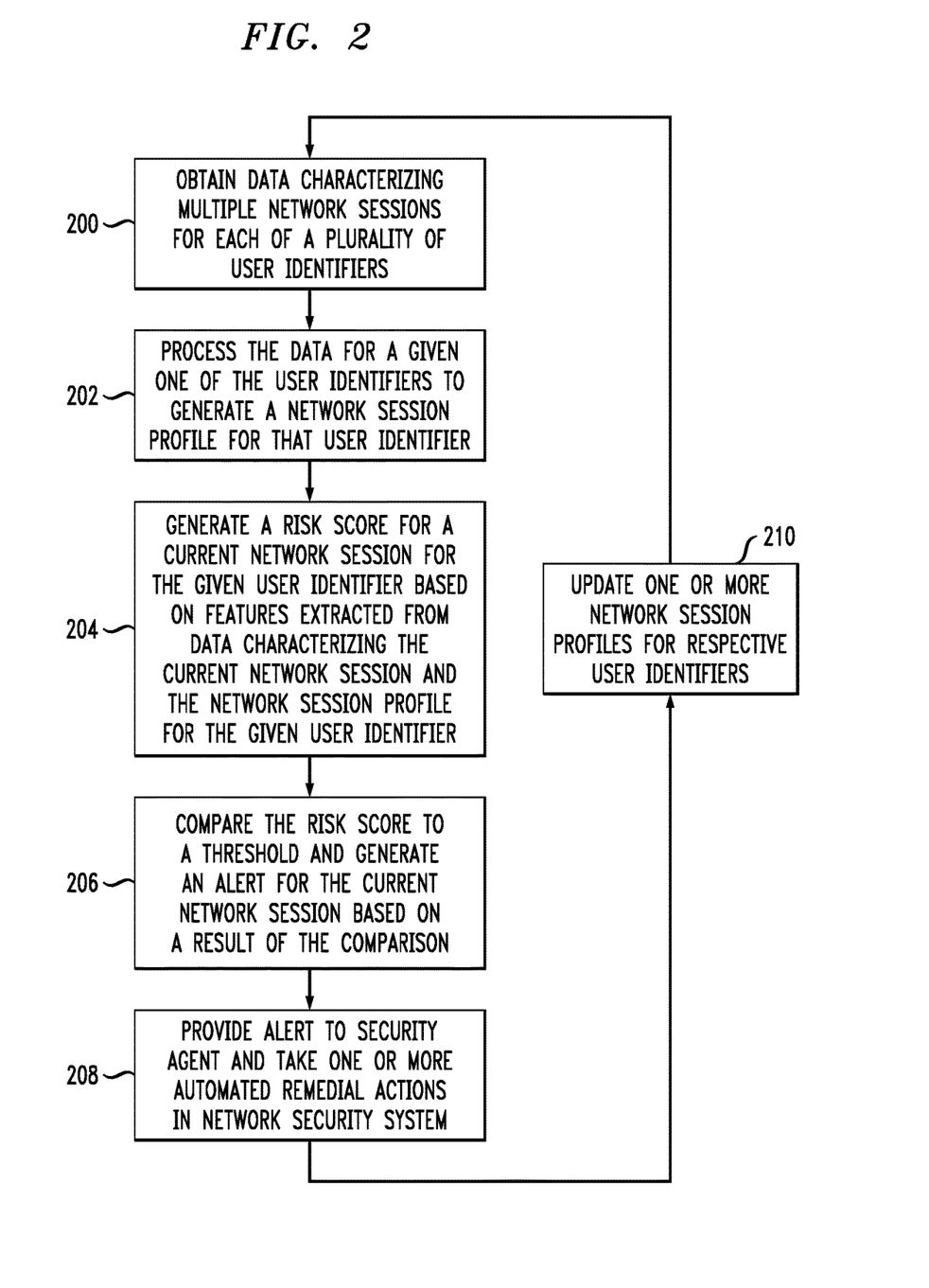
FIG. 2 is a flow diagram of a process for automated detection of session-based access anomalies in an illustrative embodiment.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

A more detailed example of one possible implementation of the FIG. 2 process is shown in the Appendix. In this example, the process is more particularly configured for VPN-based impersonation detection in a computer network, but the disclosed techniques can be adapted for use in other types of automated detection of session-based access anomalies.

Again, the particular feature extraction, risk score computation and alert generation arrangements described above and shown in the Appendix are exemplary only, and numerous alternative processing arrangements can be used in other embodiments. Accordingly, the various characteristics of these embodiments are intended to be illustrative only and should not be construed as limiting in any way.

The above-described illustrative embodiments provide significant advantages relative to conventional approaches.

For example, some embodiments are configured to provide session-based impersonation detection based on multiple user logins through respective VPN connections. Such detection is illustratively risk-based and applies session-based anomaly detection over multiple features that characterize expected behavior of a legitimate user. An arrangement of this type makes an impersonation attack much more visible since the attacker needs to mimic many aspects of the typical behavior of a legitimate user.

These and other embodiments can effectively detect common attack vectors such as those that involve use of legitimate user credentials that are stolen by an attacker through phishing, breaking into credential databases, or infecting user devices with malware. The session-based anomaly detection in illustrative embodiments is data driven and can detect an attack at an early stage of penetration before an attacker can cause further damage from within an internal network of an enterprise.

Session-based access anomaly detection is illustratively utilized as an additional protective measure to supplement conventional credential-based authentication. Drawbacks of conventional credential-based authentication can therefore be avoided in illustrative embodiments. Accordingly, security is improved and the probability of detecting a given attack at an early stage is increased. Furthermore, the risk analysis in some embodiments is applied in a backend network security system and the process is transparent with no adverse impact on usability for legitimate users.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, network session profiles, risk scores, thresholds, alerts and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

APPENDIX

VPN-Based Impersonation Detection Example

1. Input:
    VPN sessions with the following attributes:
    a. Username
    b. Hostname
    c. Start time, end time, duration
    d. IP addresses: internal, external, VPN server
    e. Session state ('open'; 'closed'; 'failed')
    f. Data: sent bytes, received bytes
2. Parameter values:
    a. bins_number = 20
        i. bins_number for the ground speed feature: 1001 (all integers in the range 0-1000)
    b. days_number = 60
    c. feature weights:
        i. hostname: 2
        ii. country: 1.5
        iii. #failed_sessions: 1.5
        iv. ASnumber: 0
        v. City: 0
        vi. All other features: 1
    d. Group weights:
        i. #failed_sessions AND sent_bytes AND ground speed: 0.9
        ii. All other features: 0.1
    e. $\beta = 0.09$
    f. $\gamma = 0.5$
    g. Risk_threshold = 0.99
    h. hostname_score_threshold = 0.05
    i. ground_speed_score_threshold = 0
    j. Number_of_VPN_sessions_threshold = 2500
    k. Number_of_distinct_users_threshold = 50
    l. Number_of_days_threshold = 14
    m. min_inner_scores = 5
    n. failed_sessions_weight = 0.5
    o. features_directionality_list =
        i. left for ground speed and sent_bytes (= the lower the score, the higher the risk)
        ii. null for all other features (= there is no correlation between the feature value and the risk)

Process Flow

1. Data pre-processing
    a. Enrichment
        i. IP ⇔ GeoLocation: Based on the external IP address generate the following attributes:
            1. Country
                a. If country = 'unknown' assign country to null
                b. There are special cases such as country = "Anonymous Proxy" or "Satellite Provider". At this point these are simply treated as yet another country name, although they provide a different type of information.

| Process Flow |
|---|

2. City
    3. Service Provider ASname
    4. Service Provider ASnumber
 b. Time normalization to user's local time zone     i. Convert_start_time and end_time to local time zone, based on the session country 2. Feature extraction
Extract features from the session's attributes. Some features are the attributes themselves, some are calculated from current and previous sessions of the same user.
 1. Device
  i. Hostname (normalized)
  In order to be consistent with the hostname that appears in the WinEvent data (for possible risk aggregations), the same normalized function is applied:
   1. Convert to lower case
   2. Truncate prefixes ending with \ or /
   3. Truncate suffixes beginning with $@ to $
   4. Trim whitespace (including nbsp)
   5. If the hostname includes a point ('.'), remove the point and everything from there on, and replace by the $ sign. For example, hostname = 'ISXXKOLMAEL3C.emc.com' will be converted to 'ISXXKOLMAEL3C$'.
 2. Location
  ii. Country
  iii. ASnumber
  iv. Ground speed score: gs score = 1 - gs_original_score/1000, where gs_original_score is the original ground speed score in accordance with a given ground speed model. The original ground speed score is assumed to be in the range [0, 1000] where 1000 is most risky. The score is converted to the range [0, 1] and in order to be aligned with the other probabilities (where the lower the probability, the higher the risk) the score direction is flipped so 0 is the most risky and 1 is the least risky.
  Also, ignore values of gs_original_score = 0 for the score calculation. This is the vast majority of the data and hence every value of gs_original_score > 0 is treated as an extreme anomaly. Removing these values flattens the distribution. The ground speed should be applied to the pre-normalized times and not to the local times.
 3. Session behavior
  v. Session duration [in seconds]
  vi. Hour: the number of seconds from midnight to the session start time, normalized to the user's local time zone. For example, if the start time of the session is 03:40:15, then hour = 3 * 3600 + 40 * 60 + 15 = 13,215. The hour feature is in the range [0, 86,399].
  Session start times vary drastically between weekends and weekdays so this feature is split into two features: weekday_hour and weekend_hour. The definition of weekend days changes between different countries. In most countries weekend days are Saturday and Sunday. However, in the following countries weekend is on Friday and Saturday:
  israel; egypt; uae; saudi; kuwait; oman; qatar; bahrain; algeria; bangladesh; iraq; jordan; libya; mauritania; sudan; maldives; syria
  Per session extract the date, the hour, and the country. Then, determine if this date is a weekday or weekend and update the suitable feature histogram, weekday_hour or weekend_hour.
  vii. Day_type: Boolean, {weekend, weekday}
  viii. Sent bytes [in MB]: Number of bytes that were sent outside of the network during the session, without normalization to session duration or number of received bytes.
 4. Previous behavior
  viii. #failed_sessions:
   1. $X_1$ = number of failed sessions per this user over the last 24 hours (taken from the current session start_time)
   2. $X_2$ = number of failed sessions per this user since the last successful session (taken from the current session start_time)
   3. #failed_sessions = $\min(X_1, X_2)$
 If the features values are empty or NAs assign a null.
3. Histogram generation
 a. Bin values:
  i. Let N denote the number of values (excluding nulls) of this feature in the profile set
  ii. Per bin i, 0 = 1, . . . , bins_number, calculate the following numbers:
   1. w[i] = width of the bin = v[i] - v[i - 1]. For categorical features assign w[i] = 1 for all i's.
   2. n[i] = number of sessions with values that fall into this bin
   3. Prob[i] = n[i]/N

| Process Flow |
|---|
| 4. Pdf[i] = Prob[i]/w[i]. This is the estimated PDF of this feature.<br>Note that Prob represents a probability function such that sum(P[i]) = 1. Pdf[i] represents a probability density function such that $\int f(x)dx = 1$; x is the feature value and f(x) = Pdf[i] where x belongs to bin i.<br>   iii. Special cases:<br>      1. If value is smaller than the lower edge of the histogram (=v[0]), set value = v[0].<br>      2. If value is larger than the upper edge of the histogram (=v[bins_number]), set value = v[bins_number]<br>For each user, there are a plurality of histograms for respective features. There are also one or more sets of group histograms for respective features.<br>4. Scoring<br>The goal of this stage is to assign a score to a session based on the historical behavior of the user and its group, as described by the extracted histograms.<br>Feature scores should be calculated only for features that have non-null values.<br>Feature scores:<br>  a. User-based feature score:<br>    i. Per a specific feature value f, find the bin i that f falls into.<br>    ii. Extract the bin probability (normalized by its width): Pdf[i]<br>    iii. Handling out-of-band values<br>      1. For numeric features,<br>        a. If f is larger than the right-most edge of the histogram, extract the probability of the right-most bin. Similarly, if f is smaller than the left-most edge of the histogram, extract the probability of the left-most bin.<br>        b. If f belongs to a bin with pdf = 0, set $s[f] = \frac{1}{2N}$, where N is the number of sessions of the user (for user score) or group (for group score), excluding the current session.<br>      2. For categorical features, if the sample is out of the histogram (e.g., new country) set $s[f] = \frac{1}{N}(1 - \exp(-\gamma M))$, where N is the number of sessions in the data set (of all the users, not only this specific user), M is the number of bins in the histogram, and $\gamma$ is a pre-defined parameter.<br>    iv. Calculate the significance: $s[f] = \Sigma_{Pdf[k] \leq pdf[i]} Prob[k]$<br>    v. S[f] is the feature score<br>  b. Value-based features:<br>    i. If the feature_directionality is not null (taken from the feature_directionality_list) the score is calculated as follows:<br>      1. Per a specific feature value f, find the bin i that f falls into.<br>      2. Extract the bin value: v[i]<br>        a. If the sample is out of the histogram (e.g., new country) set $[f] = \frac{1}{N}(1 - \exp(-\gamma M))$, where N is the number of sessions in the data set, M is the number of bins in the histogram, and y is a pre-defined parameter.<br>      3. Calculate the significance:<br>        a. If feature directionality = left then $s[f] = \Sigma_{k \leq i} Prob[k]$<br>        b. If feature directionality = right then $s[f] = \Sigma_{k \geq i} Prob[k]$<br>In the above calculation of s[f] ignore samples with value = 0.<br>      4. S[f] is the feature score<br>    ii. Special case: #failed_sessions feature<br>      1. For this feature: $s[f] = \exp(-failed\_session\_weight \cdot f)$<br>  c. Group score and user score:<br>    i. Extract the feature score from the user histogram and from the group histogram<br>    ii. This generates two features score: $S_U[f]$ and $S_G[f]$ from the user and group histograms, respectively<br>  d. Total feature score<br>    i. The feature score is a weighted combination of the two scores:<br>    ii. $S[f] = (1 - \alpha_G) \cdot S_U[f] + \alpha_G \cdot S_G[f]$; $\alpha_G$ is a group weighting function given by: $\alpha_G = e^{-\beta N}(1 - \alpha_0) + \alpha_0$, where $\alpha_0$ is a predefined initial group weighting parameter and N is the number of sessions for the user.<br>When the user has only a few sessions, the score relies more heavily on the group histogram. As the user starts having more sessions, the user histogram weighting increases and the group histogram weighting decreases. Hence, $\alpha_G$ should satisfy the following properties: |

-continued

Process Flow

1. $\alpha_G = 1$ for $N = 0$
2. $\alpha_G = \alpha_0$ for $N \to \infty$
3. $\alpha_G(N)$ is a monotonically decreasing with respect to N
   It can be verified that the formula for OCG given previously satisfies the above properties.
e. Final score:
   i. Calculate score only for sessions with at least min inner scores.

ii. Calculate the weighted multiplication of the feature likelihoods:

$$\text{Score[session]} = 1 - \frac{1}{\Sigma C_i}(C_1 \cdot S[f_1] + C_2 \cdot S[f_2] + \ldots + C_M \cdot S[f_M]),$$

where M is the number of features and the $C_i$'s are the pre-defined features weights. In this example, 1 is the most risky score and 0 the least risky score. If a specific feature has a null value it has no score. The above equation should include only features with scores. This also implies that the summation of the $C_i$'s factors is only over the non-null features.

f. Alerts:
   i. Sessions should be labeled as risky and an alert should be issued in the following cases:
      1. Alert: Score[session] $\geq$ Risk threshold
      2. Ground Speed Alert: gs_score $\leq$ ground_speed_score_threshold AND (hostname_score <= hostname_score_threshold OR hostname = null)
   ii. The two alerts are labeled differently, as an Alert and as Ground Speed Alert.

What is claimed is:

1. A method for automated detection of access anomalies, the method comprising steps of:
   obtaining data characterizing a plurality of network sessions for each of a plurality of user identifiers wherein the network sessions are initiated from a plurality of user devices over at least one network;
   processing the data characterizing the network sessions for a given one of the plurality of user identifiers to generate a network session profile for the given user identifier, the network session profile comprising a plurality of histograms for respective ones of a plurality of features extracted at least in part from the data characterizing the plurality of network sessions for the given user identifier;
   obtaining data characterizing a current network session for the given user identifier;
   generating a risk score for the current network session based on one or more features extracted from the data characterizing the current network session for the given user identifier and the network session profile for the given user identifier;
   comparing the risk score to a threshold; and
   generating an alert relating to the current session based on a result of comparing the risk score to the threshold;
   wherein the alert is transmitted over said at least one network to a security agent;
   wherein the risk score is generated as a function of one or more feature risk scores for one or more extracted features, and the feature risk score for a given extracted feature is determined by:
   obtaining a value of the feature for the current session;
   identifying a particular one of a plurality of bins of the histogram for the given extracted feature into which the feature value falls;
   computing a bin probability density function for that particular bin; and
   generating the feature risk score as a function of the bin probability density function; and
   wherein the steps are performed by at least one processing device comprising a processor coupled to a memory.

2. The method of claim 1 wherein the network sessions comprise respective virtual private network (VPN) sessions.

3. The method of claim 1 wherein the extracted features include one or more extracted features for each of device hostname, device location, session behavior and number of failed sessions.

4. The method of claim 3 wherein the one or more extracted features for device hostname comprises a normalized device hostname obtained by applying one or more normalization operations to the device hostname.

5. The method of claim 3 wherein the one or more extracted features for device location comprise a country, an autonomous system identifier and a ground speed score.

6. The method of claim 3 wherein the one or more extracted features for session behavior comprise a session start time, a session duration, a session day type indicating if the session day is a weekday or a weekend, a number of bytes sent during the session and a number of bytes received during the session.

7. The method of claim 3 wherein the one or more extracted features for number of failed sessions comprises a number of failed sessions determined as a function of:
   (i) number of failed sessions for the given user identifier over a prior time period of predetermined length; and
   (ii) number of failed sessions for the given user identifier since a last successful session for the given user identifier.

8. The method of claim 1 wherein at least one of the extracted features is extracted from the data characterizing the plurality of network sessions for the given user identifier and the data characterizing the current network session for the given user identifier.

9. The method of claim 1 wherein the histogram for a given one of the extracted features comprises a plurality of bins where i is a bin index and wherein bin i has at least the following parameters:

(i) a bin width given by w[i];
(ii) a bin probability given by Prob[i]=n[i]/N where n[i] denotes the number of network sessions having values for the given extracted feature that fall into bin i and N denotes the total number of network sessions in the plurality of network sessions for the given user identifier; and
(iii) a bin probability density function given by Pdf[i]= Prob[i]/w[i];
wherein a feature risk score for a given extracted feature is determined by:
obtaining a value of the feature for the current session;
identifying the particular one of the bins into which the feature value falls;
computing the bin probability density function for that particular bin;
computing significance of the bin probability density function; and
outputting the significance as the feature risk score.

10. The method of claim 1 wherein generating a risk score for the current network session based on the network session profile for the given user identifier comprises:
generating feature risk scores for respective ones of the extracted features;
applying weights to the feature risk scores; and
combining the weighted feature risk scores into a composite risk score.

11. The method of claim 10 wherein combining the weighted feature risk scores into a composite risk score comprises computing the composite risk score in accordance with the following equation:

$$\text{Score[session]} = 1 - \frac{1}{\sum C_i}(C_1 \cdot S[f_1] + C_2 \cdot S[f_2] + \ldots + C_M \cdot [f_M]),$$

where M is the number of extracted features, $S[f_i]$ denotes a feature risk score and $C_i$ denotes an applied weight.

12. The method of claim 1 wherein each of at least a subset of the extracted features has at least first and second histograms associated therewith, the first histogram comprising a user histogram for the corresponding extracted feature and the second histogram comprising a group histogram for that extracted feature, wherein the user histogram is generated from data characterizing the plurality of network sessions for the given user identifier and the group histogram is generated from data characterizing a plurality of network sessions for the given user identifier and data characterizing a plurality of network sessions for each of multiple other user identifiers.

13. The method of claim 12 wherein generating a risk score for the current network session based on the network session profile for the given user identifier comprises:
generating a user risk score for a given one of the extracted features utilizing the corresponding user histogram;
generating a group risk score for the given one of the extracted features utilizing the corresponding group histogram; and
combining the user risk score and the group risk score to generate a feature risk score for the given extracted feature.

14. The method of claim 13 wherein combining the user risk score and the group risk score to generate a feature risk score for the given extracted feature comprises computing the feature risk score in accordance with the following equation:

$$S[f]=(1-\alpha_G) \cdot S_U[f]+\alpha_G \cdot S_G[f],$$

where $S[f]$ is the feature risk score, $S_U[f]$ is the user risk score, $S_G[f]$ is the group risk score, $\alpha_G$ is a group weight function given by $\alpha_G = e^{-\beta N}(1-\alpha_0)+\alpha_0$, $\alpha_0$ is an initial group weight parameter and N denotes the total number of network sessions in the plurality of network sessions for the given user identifier, and where $\alpha_G=1$ for N=0, $\alpha_G=\alpha_0$ for N→∞ and $\alpha_G(N)$ is a monotonically decreasing function with respect to N.

15. The method of claim 1 wherein generating an alert relating to the current session based on a result of comparing the risk score to the threshold comprises:
generating an alert of a first type based on a result of comparing a network session risk score to a first threshold; and
generating an alert of a second type different than the first type based on a result of comparing a ground speed score to a second threshold.

16. A non-transitory processor-readable storage medium having stored therein program code of one or more software programs, wherein the program code when executed by at least one processing device causes said at least one processing device:
to obtain data characterizing a plurality of network sessions for each of a plurality of user identifiers wherein the network sessions are initiated from a plurality of user devices over at least one network;
to process the data characterizing the network sessions for a given one of the plurality of user identifiers to generate a network session profile for the given user identifier, the network session profile comprising a plurality of histograms for respective ones of a plurality of features extracted from the data characterizing the plurality of network sessions for the given user identifier;
to obtain data characterizing a current network session for the given user identifier;
to generate a risk score for the current network session based on one or more features extracted from the data characterizing the current network session for the given user identifier and the network session profile for the given user identifier;
to compare the risk score to a threshold; and
to generate an alert relating to the current session based on a result of comparing the risk score to the threshold;
wherein the alert is transmitted over said at least one network to a security agent; and
wherein the risk score is generated as a function of one or more feature risk scores for one or more extracted features, and the feature risk score for a given extracted feature is determined by:
obtaining a value of the feature for the current session;
identifying a particular one of a plurality of bins of the histogram for the given extracted feature into which the feature value falls;
computing a bin probability density function for that particular bin; and
generating the feature risk score as a function of the bin probability density function.

17. The processor-readable storage medium of claim 16 wherein each of at least a subset of the extracted features has at least first and second histograms associated therewith, the first histogram comprising a user histogram for the corresponding extracted feature and the second histogram comprising a group histogram for that extracted feature, wherein the user histogram is generated from data characterizing the plurality of network sessions for the given user identifier and the group histogram is generated from data characterizing a plurality of network sessions for the given user identifier and data characterizing a plurality of network sessions for each of multiple other user identifiers.

18. The processor-readable storage medium of claim 17 wherein the program code when executed by at least one processing device causes said at least one processing device to generate a risk score for the current network session based on the network session profile for the given user identifier by causing said at least one processing device:
to generate a user risk score for a given one of the extracted features utilizing the corresponding user histogram;
to generate a group risk score for the given one of the extracted features utilizing the corresponding group histogram; and
to combine the user risk score and the group risk score to generate a feature risk score for the given extracted feature.

19. An apparatus comprising:
at least one processing device comprising a processor coupled to a memory;
said at least one processing device being configured:
to obtain data characterizing a plurality of network sessions for each of a plurality of user identifiers wherein the network sessions are initiated from a plurality of user devices over at least one network;
to process the data characterizing the network sessions for a given one of the plurality of user identifiers to generate a network session profile for the given user identifier, the network session profile comprising a plurality of histograms for respective ones of a plurality of features extracted from the data characterizing the plurality of network sessions for the given user identifier;
to obtain data characterizing a current network session for the given user identifier;
to generate a risk score for the current network session based on one or more features extracted from the data characterizing the current network session for the given user identifier and the network session profile for the given user identifier;
to compare the risk score to a threshold; and
to generate an alert relating to the current session based on a result of comparing the risk score to the threshold;
wherein the alert is transmitted over said at least one network to a security agent; and
wherein the risk score is generated as a function of one or more feature risk scores for one or more extracted features, and the feature risk score for a given extracted feature is determined by:
obtaining a value of the feature for the current session;
identifying a particular one of a plurality of bins of the histogram for the given extracted feature into which the feature value falls;
computing a bin probability density function for that particular bin; and
generating the feature risk score as a function of the bin probability density function.

20. The apparatus of claim 19 wherein each of at least a subset of the extracted features has at least first and second histograms associated therewith, the first histogram comprising a user histogram for the corresponding extracted feature and the second histogram comprising a group histogram for that extracted feature, wherein the user histogram is generated from data characterizing the plurality of network sessions for the given user identifier and the group histogram is generated from data characterizing a plurality of network sessions for the given user identifier and data characterizing a plurality of network sessions for each of multiple other user identifiers.

21. The apparatus of claim 19 wherein said at least one processing device is further configured to execute one or more automated remedial actions responsive to the alert and wherein the one or more automated remedial actions comprise at least one of:
terminating the current access; and
suspending the current access until one or more specified authentication factors are obtained and verified for the given user identifier.

* * * * *